US012807507B2

(12) United States Patent
Lai et al.

(10) Patent No.: US 12,807,507 B2
(45) Date of Patent: Nov. 24, 2026

(54) METHOD FOR PREPARING SOLID-STATE ELECTROLYTE POWDER

(71) Applicants: SolidEdge Solution Inc., Hsinchu City (TW); HON HAI PRECISION INDUSTRY CO., LTD., New Taipei City (TW)

(72) Inventors: Hong-Zheng Lai, Hsinchu City (TW); Tseng-Lung Chang, Hsinchu City (TW)

(73) Assignees: SolidEdge Solution Inc., Hsinchu City (TW); HON HAI PRECISION INDUSTRY CO., LTD., New Taipei City (TW)

( * ) Notice: Subject to any disclaimer, the term of this patent is extended or adjusted under 35 U.S.C. 154(b) by 1054 days.

(21) Appl. No.: 17/846,567

(22) Filed: Jun. 22, 2022

(65) Prior Publication Data

US 2023/0150831 A1 May 18, 2023

(30) Foreign Application Priority Data

Nov. 18, 2021 (TW) ................................ 110143008

(51) Int. Cl.
*C01G 25/00* (2006.01)
*H01M 10/0562* (2010.01)

(52) U.S. Cl.
CPC ........ *C01G 25/006* (2013.01); *C01P 2002/50* (2013.01); *C01P 2002/74* (2013.01);
(Continued)

(58) Field of Classification Search
CPC ............. C01P 2004/61; C01P 2004/62; C01P 2006/40; H01M 10/0562;
(Continued)

(56) References Cited

U.S. PATENT DOCUMENTS 10,566,611 B2 2/2020 Allie et al.
2019/0027780 A1 * 1/2019 Liu ...................... H01M 4/366
(Continued)

FOREIGN PATENT DOCUMENTS

CN 101608255 B * 7/2012
CN 102875143 A 1/2013
(Continued)

OTHER PUBLICATIONS

CN 112299844 A, English Machine Translation, Feb. 2, 2021 (Year: 2021).*
(Continued)

*Primary Examiner* — Christina A Johnson
(74) *Attorney, Agent, or Firm* — CKC & Partners Co., LLC

(57) ABSTRACT

A method for preparing a solid-state electrolyte powder includes the following steps. An oxygen-free sintering process is performed at a first sintering temperature, such that a refined salt mixture forms a solid-state electrolyte powder precursor mixture. An oxygen-containing sintering process is performed at a second sintering temperature, such that the solid-state electrolyte powder precursor mixture forms a solid-state electrolyte powder, in which the second sintering temperature is higher than the first sintering temperature.

18 Claims, 7 Drawing Sheets

(52) U.S. Cl.
CPC ...... *C01P 2004/61* (2013.01); *C01P 2004/62* (2013.01); *C01P 2006/40* (2013.01); *H01M 10/0562* (2013.01); *H01M 2300/0077* (2013.01)

(58) Field of Classification Search
CPC ........... H01M 2300/0068; Y02E 60/10; C04B 35/622; C04B 35/6261; C04B 35/64
See application file for complete search history.

(56) References Cited

U.S. PATENT DOCUMENTS

| | | | |
|---|---|---|---|
| 2020/0083562 | A1 | 3/2020 | Kim et al. |
| 2022/0336847 | A1 | 10/2022 | Ye et al. |

FOREIGN PATENT DOCUMENTS

| | | | | | |
|---|---|---|---|---|---|
| CN | 103618101 | A | | 3/2014 | |
| CN | 105406114 | A | | 3/2016 | |
| CN | 107848894 | A | | 3/2018 | |
| CN | 108604665 | A | | 9/2018 | |
| CN | 111116198 | A | | 5/2020 | |
| CN | 111732432 | A | | 10/2020 | |
| CN | 112299844 | A | * | 2/2021 | ............ C04B 35/64 |
| CN | 113328136 | A | | 8/2021 | |
| CN | 113511675 | A | | 10/2021 | |
| CN | 113943151 | A | | 1/2022 | |
| JP | 2015048280 | A | | 3/2015 | |
| TW | I694629 | B | | 5/2020 | |

OTHER PUBLICATIONS

CN 101608255 B, English Machine Translation, 2012 (Year: 2012).*
JP 2015048280 A, English Machine Translation, 2015 (Year: 2015).*
Brugge, R. H. et al., "Germanium as a donor dopant in garnet electrolytes", Solid State Ionics, 337, https://doi.org/10.1016/j.ssi.2019.04.021, May 1, 2019, 154-160.

* cited by examiner

METHOD FOR PREPARING SOLID-STATE ELECTROLYTE POWDER

CROSS-REFERENCE TO RELATED APPLICATION

This application claims priority to Taiwan Application Serial Number 110143008, filed Nov. 18, 2021, which is herein incorporated by reference.

BACKGROUND

Field of Invention

The present disclosure relates to a method for preparing a solid-state electrolyte powder.

Description of Related Art

In recent years, due to the safety issues of liquid electrolytes, solid-state electrolytes is gradually used to replace the traditional liquid electrolytes in commercial lithium batteries, which not only improves the safety of the batteries, but also provides more flexibility in the design of the battery structure and can further effectively increase the energy density of the battery to meet the market demand. However, the solid-state electrolyte is limited by the barriers of grain boundaries and the migration rate of lithium ions in the solid-state electrolyte cannot be increased, resulting solid-state electrolytes with low ionic conductivity that cannot meet the practical requirements. Therefore, how to improve the conductivity of the solid-state electrolyte from the process aspect is indeed the focus of research and development in the industry.

SUMMARY

According to some embodiments of the present disclosure, a method for preparing a solid-state electrolyte powder includes the following steps. An oxygen-free sintering process is performed at a first sintering temperature, such that a salt mixture forms a solid-state electrolyte powder precursor mixture. An oxygen-containing sintering process is performed at a second sintering temperature, such that the solid-state electrolyte powder precursor mixture forms the solid-state electrolyte powder, in which the second sintering temperature is higher than the first sintering temperature.

In some embodiments of the present disclosure, the first sintering temperature is between 800° C. and 1100° C., and the second sintering temperature is between 850° C. and 1280° C.

In some embodiments of the present disclosure, the method for preparing the solid-state electrolyte powder further includes: performing a grinding process after the oxygen-free sintering process and before the oxygen-containing sintering process, such that the solid-state electrolyte powder precursor mixture forms a refined solid-state electrolyte powder precursor mixture, in which the oxygen-containing sintering process is performed such that the refined solid-state electrolyte powder precursor mixture forms the solid-state electrolyte powder; and/or performing another grinding process after the oxygen-containing sintering process, such that the solid-state electrolyte powder forms a refined solid-state electrolyte powder.

In some embodiments of the present disclosure, the grinding process performed after the oxygen-containing sintering process includes at least one wet grinding step and/or at least one dry grinding step.

In some embodiments of the present disclosure, the salt mixture includes a first salt and a second salt, and the method of preparing the solid-state electrolyte powder further includes the following step: performing a grinding process before the oxygen-free sintering process, such that the salt mixture forms a refined salt mixture, in which the average particle size (D50) of the first salt before the grinding process is greater than the average particle size (D50) of the second salt before the grinding process, and/or the hardness of the first salt is higher than the hardness of the second salt, and the oxygen-free sintering process is performed such that the refined salt mixture forms the solid-state electrolyte powder precursor mixture.

In some embodiments of the present disclosure, a grinding process is performed before the oxygen-free sintering process to make the salt mixture form a refined salt mixture and the grinding process includes the following steps: performing a preliminary grinding step, such that the first salt forms a preliminarily refined first salt; mixing the preliminarily refined first salt and the second salt; and performing a secondary grinding step to form the refined salt mixture.

In some embodiments of the present disclosure, a grinding speed of between 2400 rpm and 2800 rpm is used for the preliminary grinding step, and a grinding speed of the between 2800 rpm and 3200 rpm is used for the secondary grinding step.

In some embodiments of the present disclosure, the preliminarily refined first salt has an average particle size (D50) of between 5 μm and 20 μm, and the refined salt mixture has an average particle size (D50) of between 0.2 μm and 1 μm.

In some embodiments of the present disclosure, the oxygen-containing sintering process is carried out in a sintering equipment including at least a first pipeline and a second pipeline, in which the oxygen required for the oxygen-containing sintering process enters through the first pipeline, and the carbon dioxide generated by the oxygen-containing sintering process exits through the second pipeline.

In some embodiments of the present disclosure, the first pipeline is positioned higher in the sintering equipment than the second pipeline is in the sintering equipment.

According to the aforementioned embodiments of the present disclosure, since the method of preparing the solid-state electrolyte powder of the present disclosure includes a two-stage sintering process in sequence, and the two-stage sintering process is performed in an oxygen-free environment and in the presence of oxygen, respectively, it can provide a stable and quantitative process and save process costs, and can enhance the process yield to improve the quality of the solid-state electrolyte powder formed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
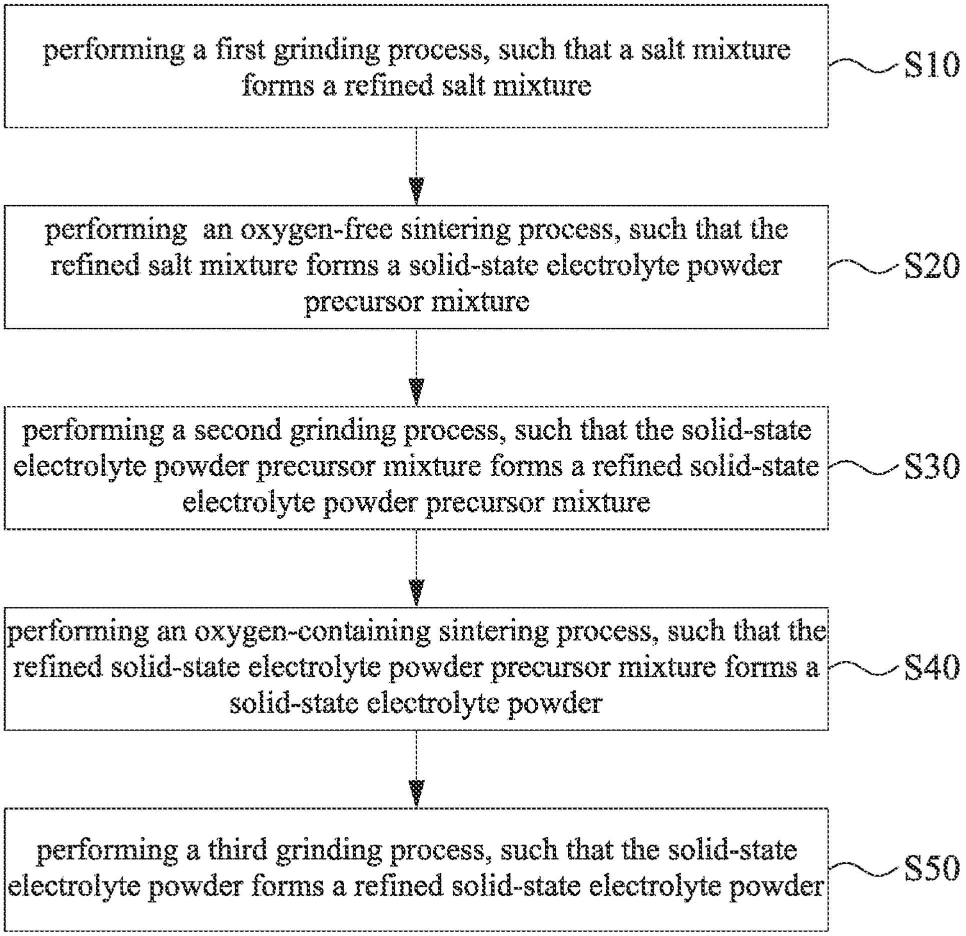
FIG. 1 illustrates a flowchart of a method for preparing a solid-state electrolyte powder according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

In conventional one-step sintering process such as the sintering process of lithium lanthanum zirconium oxide (e.g., $Li_7La_3Zr_2O_{12}$, LLZO), it is difficult to control the accuracy of phase formation and product yield. For example, after one-step sintering, the oxygen-deficient phase of lanthanum zirconate ($La_2Zr_2O_7$, LZO), the tetragonal-type LLZO that has not been successfully converted, and the cubic-type LLZO that is desired are produced at the same time, and the ratios of the three are not the same, making it unable to be produced on a commercial scale.

Hence, in an aspect, the present disclosure provides a method for preparing a solid-state electrolyte powder that can be applied in a solid-state battery (e.g., as a raw material for a solid-state electrolyte film). The inventor has observed that since the method for preparing the solid-state electrolyte powder includes a two-stage sintering process, in which the a two-stage sintering process includes an oxygen-free sintering process and an oxygen-containing sintering process that are carried out sequentially, the method for preparing a solid-state electrolyte powder of the present disclosure can provide a stable and quantitative process and save process costs, and can improve the process yield, so as to improve the quality of the solid-state electrolyte powder formed.

In another aspect, the method for preparing the solid-state electrolyte powder of the present disclosure further includes a two-stage pre-grinding process. Due to the difference in particle size and hardness of the material, it is difficult to achieve uniformity of particle size using the conventional one-step grinding process. Since the uniformity of particle size of the material has an impact on the yield of the phase conversion during the final sintering, the two-stage pre-grinding process can be used to achieve uniformity of particle size, thereby improving the yield of phase conversion during the final sintering.

In another aspect, the method for preparing the solid-state electrolyte powder of the present disclosure further includes a grinding process after the oxygen-free sintering process and before the oxygen-containing sintering process; and/or a grinding process after the oxygen-containing sintering process to obtain solid-state electrolyte powder of desired particle size and to further improve the product yield, and when the solid-state electrolyte powder is applied to a solid-state cell, the suitable particle size of the solid-state electrolyte powder can also effectively improve the electrical performance of the solid-state cell.

Referring to FIG. 1, a flowchart illustrating a method for preparing a solid-state electrolyte powder according to some embodiments of the present disclosure is shown. The method for preparing the solid-state electrolyte powder includes step S10 to step S50, and step S10 to step S50 may be performed sequentially. In step S10, a first grinding process is performed, such that a salt mixture forms a refined salt mixture. In step S20, an oxygen-free sintering process is performed, such that the refined salt mixture forms a solid-state electrolyte powder precursor mixture. In step S30, a second grinding process is performed, such that the solid-state electrolyte powder precursor mixture forms a refined solid-state electrolyte powder precursor mixture. In step S40, an oxygen-containing sintering process is performed, such that the refined solid-state electrolyte powder precursor mixture forms a solid-state electrolyte powder. In step S50, a third grinding process is performed, such that the solid-state electrolyte powder forms a refined solid-state electrolyte powder. Each of the above steps is further described in the following description.

Firstly, in step S10, a salt mixture is provided, and a first grinding process is performed, such that the salt mixture forms a refined salt mixture. In some embodiments, the salt mixture includes a first salt and a second salt, in which the first salt may include non-lithium source compounds, for example, a zirconium source compound, a lanthanum source compound, etc., such as zirconium dioxide ($ZrO_2$), lanthanum oxide ($La_2O_3$), and lanthanum hydroxide ($La(OH)_3$); the first salt may further optionally include a dopant, for example, a gallium source compound, an aluminum source compound, a tantalum source compound, etc., such as gallium oxide ($Ga_2O_3$), aluminum oxide ($Al_2O_3$), tantalum oxide ($Ta_2O_3$), and tantalum pentoxide ($Ta_2O_5$); in which when dopant is used, the dopant may be used alone or in combination. The second salt may include lithium source compounds, such as lithium carbonate ($Li_2CO_3$), lithium hydroxide (LiOH), and lithium nitrate ($LiNO_3$), which may be used alone or in combination. In some embodiments, the average particle size (D50) of the first salt before the first grinding process is greater than an average particle size (D50) of the second salt before the first grinding process and/or the hardness of the first salt is higher than the hardness of the second salt. For example, the average particle size (D50) of the first salt is between 5 μm and 20 μm, and the average particle size (D50) of the second salt can be between 3 μm and 10 μm; the Mohs hardness of the first salt is higher than the Mohs hardness of the second salt. It should be noted that the "average particle size (D50) of the first (or second) salt" in the present disclosure is "the value obtained by averaging the respective D50 particle size of each salt of the first (or second) salt." In some embodiments, based on 100 wt % of the salt mixture, the content of the first salt may be between 70 wt % and 78 wt %, and the content of the second salt may be 22 wt % and 30 wt %, which facilitates the formation of a solid-state electrolyte powder with the desired crystal coordination structure during the subsequent sintering process.

In some embodiments, since the first salt and the second salt have different sizes (e.g., average particle size (D50)), hardness, and/or content, the first salt and the second salt may be designed to start to be ground at different steps during the first grinding process, such that the resulting refined salt mixture has a uniform and small particle size, and each salt is uniformly distributed in the refined salt mixture (i.e., the localized concentration of a particular salt is avoided) to improve the coordination accuracy of each salt in the subsequent sintering process and to form a solid-state electrolyte powder with the desired crystal structure coordination. In addition, since the refined salt mixture has a uniform and small particle size, it can have a certain specific surface area to provide a larger reaction rate in the subsequent sintering process, thus saving the time of the sintering process. Specifically, the first grinding process may include a preliminary grinding step and a secondary grinding step that are performed sequentially and continuously, and the details of which are described below.

In the preliminary grinding step, the first salt and a solvent are uniformly mixed to form a mixed solution, and the mixed solution is wet-ground. In detail, a plurality of grinding beads and the mixed solution including the first salt and the solvent are placed in a grinding jar and uniformly mixed, and then the mixed solution is wet-ground using a grinding equipment such as a ceramic nano-grinding machine. During the preliminary grinding step, the plurality of grinding beads will collide with the mixed solution, causing the originally agglomerated mixed solution to be sufficiently dispersed. In some embodiments, the solvent may be, for example, ethanol (with a purity of 95%), propanol (with a purity of 95%), isopropanol, water, or combinations thereof, and when the solvent is a mixture of ethanol and water, the volume ratio of ethanol in the solvent may be between 20% and 99.9%, or the volume ratio of water in the solvent can be between 50% and 99.9%. In some preferred embodiments, the solvent is a mixture of ethanol (or propanol) and water to avoid adverse effects of differences in compatibility between the solvent and the powder on the subsequent grinding process and sintering process. During the preliminary grinding step, the grinding beads may be, for example, zirconium beads with a diameter of 0.8 mm to 1.5 mm, the filling ratio may be 70% to 85%, the grinding speed may be between 2400 rpm and 2800 rpm, the grinding time may be between 2 hours and 5 hours, and the grinding temperature may be between 20° C. and 35° C. After the first salt is subjected to the wet grinding process using the above grinding parameters, a preliminary refined first salt can be obtained to facilitate the uniform mixing of the first salt and the second salt that is subsequently added and is smaller in size. In some embodiments, the preliminarily refined first salt may have an average particle diameter (D50) between 5 μm and 20 μm.

In the secondary grinding step, a mixed solution including the second salt and a solvent is further poured into the grinding equipment containing the mixed solution of the preliminary refined first salt to continue the wet grinding. In some embodiments, the amount, ratio, and type of the solvent mixed with the second salt may be identical to the amount, ratio, and type of the solvent mixed with the first salt as described above. During the secondary grinding step, the grinding beads may be, for example, zirconium beads with a diameter of 0.8 mm to 1.5 mm, the filling ratio may be 70% to 85%, the grinding speed may be between, for example, 2800 rpm and 3200 rpm, the grinding time may be between, for example, 2 hours and 6 hours, and the grinding temperature may be between 20° C. and 35° C. After the second salt and the preliminarily refined first salt are subjected to the wet grinding process using the above grinding parameters, a refined salt mixture which includes a refined first salt and a refined second salt is obtained. Specifically, after the secondary grinding step, the refined salt mixture may have an average particle diameter (D50) of between 0.2 μm and 1 μm.

In some embodiments, the pre-grinding process is carried out in stages, so that the first salt with larger particle size, higher hardness, and/or more content can be preliminarily (the first stage) ground first, and then the second salt with smaller particle size, lower hardness, and/or less content is mixed into the preliminary refined first salt for the second stage grinding. Accordingly, the first salt with larger particle size and/or higher hardness will not be overly sized or unevenly distributed due to uneven grinding and/or insufficient grinding time, thus achieving a refined salt mixture with uniform particle size. In this way, the coordination accuracy and the effective phase conversion rate of the salts in the subsequent sintering process can be improved, resulting in the formation of a solid-state electrolyte powder with desired crystal structure coordination and saving the time of the sintering process.

Next, in step S20, an oxygen-free sintering process is performed, such that the refined salt mixture forms a solid-state electrolyte powder precursor mixture including, for example, a solid-state electrolyte powder precursor and an unreacted refined salt mixture. In detail, the refined salt mixture obtained in step S10 can be placed in a sintering equipment such as a sintering furnace, and an oxygen-free sintering process may be performed at a first sintering temperature, such that the refined salt mixture forms the solid-state electrolyte powder precursor. When sintering in an oxygen-free environment, the sintering energy can be focused on the stable formation of solid-state electrolyte powder precursor in crystalline form from the refined salt mixture to avoid direct formation of solid-state electrolyte powders. In this way, it is advantageous to accurately form solid-state electrolyte powders with the desired crystal structure coordination by controlling other parameters in the subsequent oxygen-containing sintering process. In some embodiments, the solid-state electrolyte powder precursor may be, for example, a precursor of LLZO, and specifically may be, for example, LZO. During the oxygen-free sintering process, the sintering temperature (i.e., the first sintering temperature) can be controlled between 800° C. and 1100° C., preferably between 900° C. and 980° C., such that the refined salt mixture can form solid-state electrolyte powder precursor first and improve the phase formation ratio. In detail, a sintering temperature of 800° C. or higher is preferred to provide sufficient energy for the formation of solid-state electrolyte powder precursor; in addition, it is preferable to control the first sintering temperature to be no more than 1100° C. Too high sintering temperature may lead to the formation of impurity phases, which is not conducive to the subsequent formation of solid-state electrolyte powder. The sintering time required for the oxygen-free sintering process depends on the amount of powder to be sintered and the sintering temperature. In some embodiments, the sintering time of the oxygen-free sintering process may be between 10 hours and 16 hours to ensure the conversion of the refined salt mixture into the solid-state electrolyte powder precursor and to avoid the formation of impurity phases due to over-reaction.

Subsequently, in step S30, a second grinding process is performed, such that the solid-state electrolyte powder precursor mixture forms a refined solid-state electrolyte powder precursor mixture. In detail, the refined solid-state electrolyte powder precursor mixture may be dry ground using a grinding equipment such as a vertical pulverizing machine to further reduce the particle size of the solid-state electrolyte powder precursor mixture so as to further improve the coordination accuracy and the effective phase conversion rate in the subsequent oxygen-containing sintering process. During the second grinding process, the grinding temperature may be room temperature and the grinding time may be between 3 minutes and 7 minutes, for example. After dry grinding of the solid-state electrolyte powder precursor mixture using the above grinding parameters, the refined solid-state electrolyte powder precursor mixture is obtained, of which the secondary agglomerate particles have, for example, an average particle size (D50) between 45 μm and 55 μm.

Next, in step S40, an oxygen-containing sintering process is performed, such that the refined solid-state electrolyte powder precursor mixture forms a solid-state electrolyte powder. In detail, the refined solid-state electrolyte powder precursor mixture obtained in step S30 may be placed in the sintering equipment, and the oxygen-containing sintering process is performed at a second sintering temperature, such that the refined salt mixture (e.g., the second salt) that has not yet reacted is further coordinated with the refined solid-state electrolyte powder precursor (e.g., so that the crystal lattice of LZO is changed under the reaction of oxygen and the second salt in the sintering equipment enters the lattice for coordination), and further undergoes a phase conversion during or after coordination to form the solid-state electrolyte powder with the desired crystal structure coordination. More specifically, the solid-state electrolyte powder with the desired crystal structure coordination may be, for example, LLZO with a cubic crystal structure. The present disclosure provides a sintering process carried out in stages, in which in the first stage of oxygen-free sintering environment, the salt mixture undergoes a chemical reaction with sufficient energy to form a structurally stable solid-state electrolyte powder precursor, and then in the second stage of oxygen-including environment, the solid-state electrolyte powder precursor forms a solid-state electrolyte powder of the correct phase (cubic type), thus avoiding the problems of uneven reactions due to multi-stage phase conversion and oxidation procedures, formation of impurity phases due to insufficient local energy, and the difficulty of phase conversion due to surface densification that need to be overcome simultaneously in the conventional one-step sintering process for the starting materials (e.g., the salt mixture), and ensuring that relatively stable solid-state electrolyte powder precursor is generated first to facilitate the subsequent formation of solid-state electrolyte powder with the desired crystal structure coordination. In other words, the sintering process is carried out in stages to avoid the problems of poor quality and yield caused by the desire to form the solid-state electrolyte powder in a single step. Based on the above, by carrying the sintering process in stages, a large amount of solid-state electrolyte powder precursor can be produced in an oxygen-free environment, and then the solid-state electrolyte powder can be formed in the presence of oxygen through finer parameter control, thus saving the cost of oxygen and the time of the sintering process.

The sintering temperature used during the oxygen-containing sintering process (i.e., the second sintering temperature) is higher than the sintering temperature used during the oxygen-free sintering process (i.e., the first sintering temperature) to promote the formation of crystals. Specifically, the second sintering temperature may be controlled between 850° C. and 1280° C. to facilitate the formation of the solid-state electrolyte powder with the desired crystal structure coordination and to avoid the formation of impurity phases due to over-reaction. In detail, the second sintering temperature is preferably 850° C. or higher to provide sufficient energy to convert the solid-state electrolyte powder precursor mixture into the solid-state electrolyte powder. Insufficient temperature tends to produce crystal densification and tends to stay in the non-desired tetragonal crystal phase. In addition, it is preferable to control the second sintering temperature to no higher than 1280° C. Too high a sintering temperature may result in the formation of impurity phases. In some embodiments, the second sintering temperature can be further adjusted based on the amount of starting material (e.g., the salt mixture) to further improve the coordination and phase conversion yields. Specifically, the second sintering temperature may be between 850° C. and 1000° C. for a small batch reaction (e.g., with about 10 kg of salt mixture as the starting material) and from between 1130° C. and 1280° C. for a large batch reaction (e.g., with about 50 kg of salt mixture as the starting material). When the dopant is present, the required sintering time may be longer, and the sintering temperature may be higher. In some embodiments, the oxygen flow rate may be between 6 L/min and 40 L/min, where the oxygen flow rate may be, for example, between 6 L/min and 10 L/min for small batches (e.g., with about 1-5 kg of salt mixture as the starting material) and between 20 L/min and 40 L/min for large batches (e.g., with 10-50 kg of salt mixture as the starting material. The sintering time required for the oxygen-containing sintering process depends on the amount of sintering powder and the sintering temperature. In some embodiments, the holding time with constant sintering temperature at the end of the oxygen-containing sintering process may be between 14 hours and 24 hours to ensure that the refined solid-state electrolyte powder precursor actually forms the solid-state electrolyte powder and to avoid the formation of impurity phases due to over-reaction.

Figure 2:
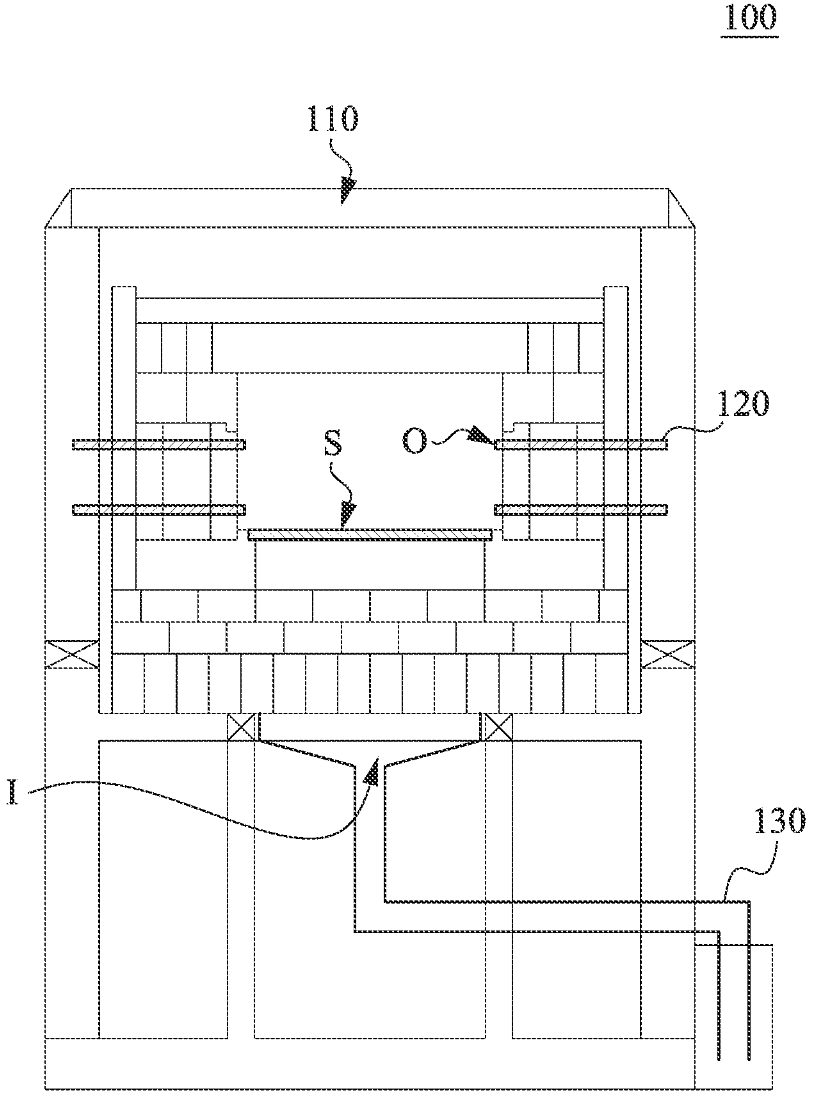
FIG. 2 illustrates a side perspective view of sintering equipment according to some embodiments of the present disclosure.

On the other hand, in some embodiments, the coordination and phase conversion yields of the solid-state electrolyte powder can be further improved by specific design of the sintering equipment. Specifically, see FIG. 2, which illustrates a side perspective view of the sintering equipment 100 according to some embodiments of the present disclosure. The sintering equipment 100 includes a sintering furnace body 110, at least a first pipeline 120 (including four first pipelines 120 in the embodiment of FIG. 2), and a second pipeline 130, in which the first pipeline 120 is configured to enable oxygen required for the oxygen-containing sintering process to enter the sintering furnace body 110, and the second pipeline 130 is configured to enable carbon dioxide generated by the oxygen-containing sintering process to exit from the sintering furnace body 110. By diverting the oxygen and carbon dioxide from each other, the reaction can be more complete, and the reaction time can be shortened. In addition, since the weight of carbon dioxide is greater than the weight of oxygen, the first pipeline 120 is configured above the second pipeline 130, that is, the first pipeline 120 is positioned higher in the sintering equipment 100 than the second pipeline 130 is in the sintering equipment 100, to better achieve a diversion effect. In some embodiments, when observed from a top-view perspective (i.e., when observed from top to bottom in FIG. 2), the gas inlet I of the second pipeline 130 may be surrounded by gas outlets O of multiple first pipelines 120, and the cross-sectional area of the gas inlet I of the second pipeline 130 is larger than the cross-sectional area of the gas outlet O of the first pipeline 120 to facilitate the rapid discharge of carbon dioxide and residual oxidized gases, thereby increasing the reaction yield and shortening the reaction time. In some embodiments, a sample S containing the refined solid-state electrolyte powder precursor is laterally surrounded by the gas outlets O of multiple first pipelines 120 to enhance the reaction rate.

Next, in step S50, a third grinding process is performed, such that the solid-state electrolyte powder formed in step S40 forms a refined solid-state electrolyte powder. In detail, the third grinding process may include, for example, at least one dry grinding step and/or at least one wet grinding step. In some embodiments, the third grinding process includes at least one dry grinding step and/or at least one wet grinding step, in which the dry grinding step and the wet grinding step may be performed sequentially. Regarding the dry grinding step, grinding equipment such as a vertical pulverizing machine may be used. During the dry grinding step, the grinding temperature may be, for example, room temperature, and the grinding time may be, for example, between 8 minutes and 12 minutes. After the dry grinding step of the solid-state electrolyte powder, a preliminarily refined solid-state electrolyte powder with an average particle size (D50) between 25 μm and 30 μm is obtained. Regarding the wet grinding step, a plurality of grinding beads the mixed solution including the preliminarily refined solid-state electrolyte powder and solvent may be placed in a grinding jar and uniformly mixed, and the mixed solution is then subjected to a wet grinding step using a grinding equipment such as a ceramic nano-grinding machine In some embodiments, the amount, ratio, and type of the solvent mixed with the preliminarily refined solid-state electrolyte powder may be identical to the amount, ratio, and type of the solvent used in the aforementioned secondary grinding step. During the wet grinding step, the grinding beads of the grinding equipment may be, for example, zirconium beads with a diameter of 0.1 mm to 0.3 mm, the filling ratio may be 70% to 85%, the grinding speed may be, for example, from 2800 rpm to 3200 rpm, the time may be, for example, 2 hours to 8 hours, and the grinding temperature may be, for example, 20° C. to 40° C. After the wet grinding of the preliminary refined solid-state electrolyte powder using the above-mentioned grinding parameters, the refined solid-state electrolyte powder having an average particle size (D50) between 300 nm and 700 nm is obtained. For example, the refined solid-state electrolyte powder may have an average particle size (D50) of 500 nm. In some embodiments, multiple dry grinding steps and multiple wet grinding steps may be performed depending on actual needs to produce the refined solid-state electrolyte powders with particle sizes that meet the specification, and the dry grinding steps and the wet grinding steps may be alternately performed. It is worth mentioning that the third grinding process can further take way passivated substances from the surface of the solid-state electrolyte powders and further improve the purity of the solid-state electrolyte powders.

When solid-state electrolyte powders are used in batteries (e.g., solid-state batteries), it is preferable to provide solid-state electrolyte powders of from nanoscale to no more than 3 μm due to electrical requirements.

In some embodiments, the method for preparing the solid-state electrolyte powder may further include at least one ultrasonic vibratory sieving process, which may be performed after the first grinding process and before the oxygen-free sintering process to filter out salt mixtures with oversized particle size. The ultrasonic vibration sieving process may also be carried out after the third grinding process to filter out solid-state electrolyte powder with oversized particle size.

It should be understood that the connection relationships and efficacy of the components already described will not be repeated. In the following description, the inventors further verify the differences between the products produced using conventional one-step sintering and the products (solid-state electrolyte) produced using the methods for preparing the solid-state electrolyte powder according to some embodiments of the disclosure by means of X-ray diffraction analysis (XRD) spectra. It should be understood that in each XRD spectrum, the horizontal axis represents the signal intensity, which represents the number of collected photons in counts, and the vertical axis represents 28 (2-theta), which refers to scattering angle 28, i.e., the angle between the extension of the incident X-rays and the reflected X-rays in degrees (Deg).

Figure 3:
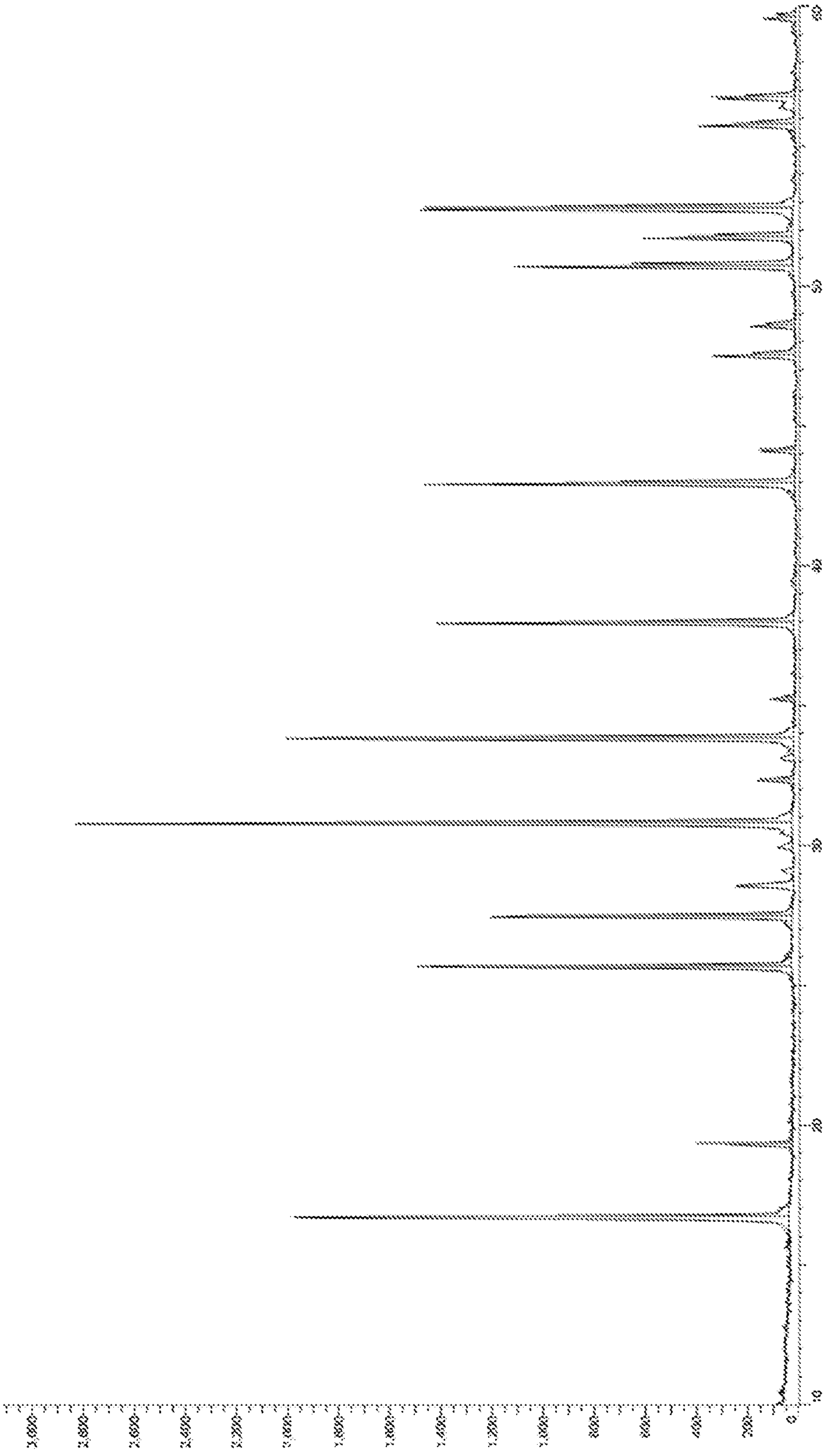
FIGS. 3 to 5 show XRD (X-ray Diffraction) spectra of the products produced by the traditional one-step sintering process under three conditions, respectively.
Figure 4:
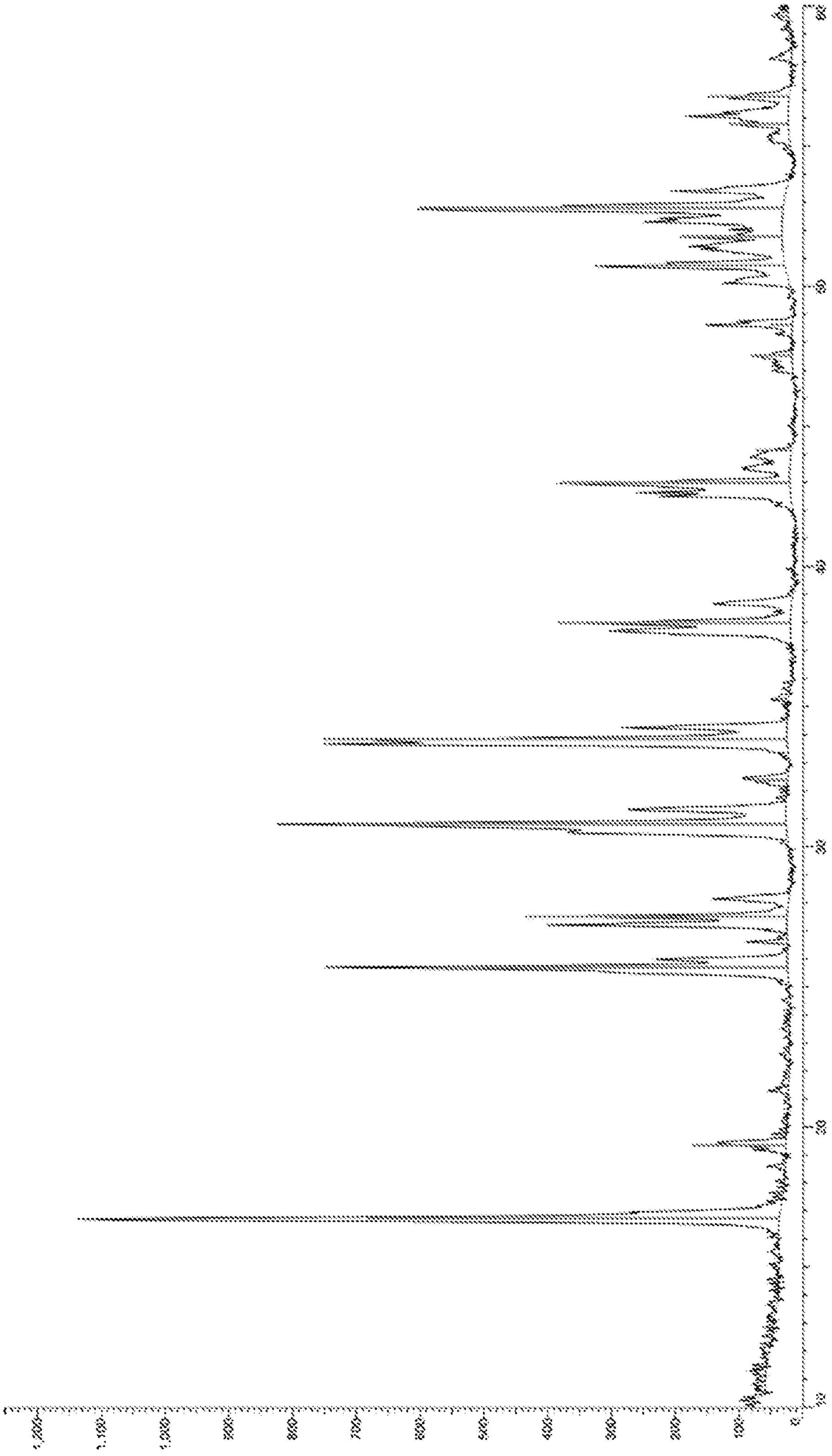
Figure 5:
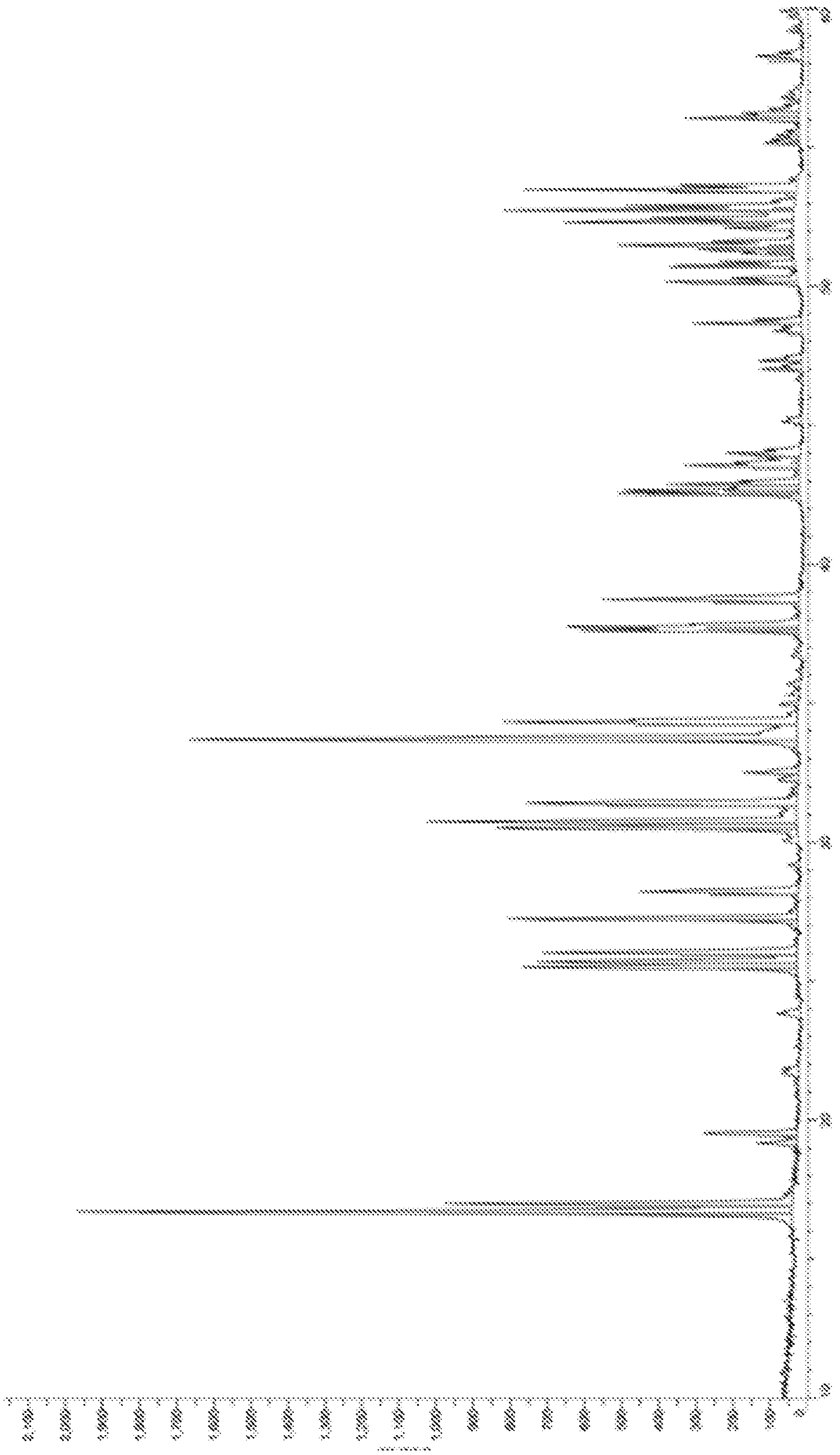

Firstly, FIGS. 3 to 5 respectively show the XRD spectra of the products produced by conventional one-step sintering in three conditions, where FIG. 3 shows a condition in which the products contain both oxygen-deficient LZO and cubic-type LLZO, FIG. 4 shows a condition in which the products contain both a large amount of the tetragonal-type LLZO and a small amount of the cubic-type LLZO, and FIG. 5 shows a condition in which the products contain almost only tetragonal-type LLZO. In other words, the conventional one-step sintering is not effective in producing high-purity cubic LLZO, and the product still contains many non-desired oxygen-deficient LZO and tetragonal-type LLZO. It should be noted that in the conventional one-step sintering used in this example, the starting material used is $La_2O_3$/$ZrO_2$/$Li_2CO_3$/$Ga_2O_3$ mixed in a ratio of 30-50%/20-40%/20-40%/1-5%, the amount of sintering powder is 2.5 kg, the sintering temperature is 980° C., and the sintering time is 14 hours (h).

Figure 6:
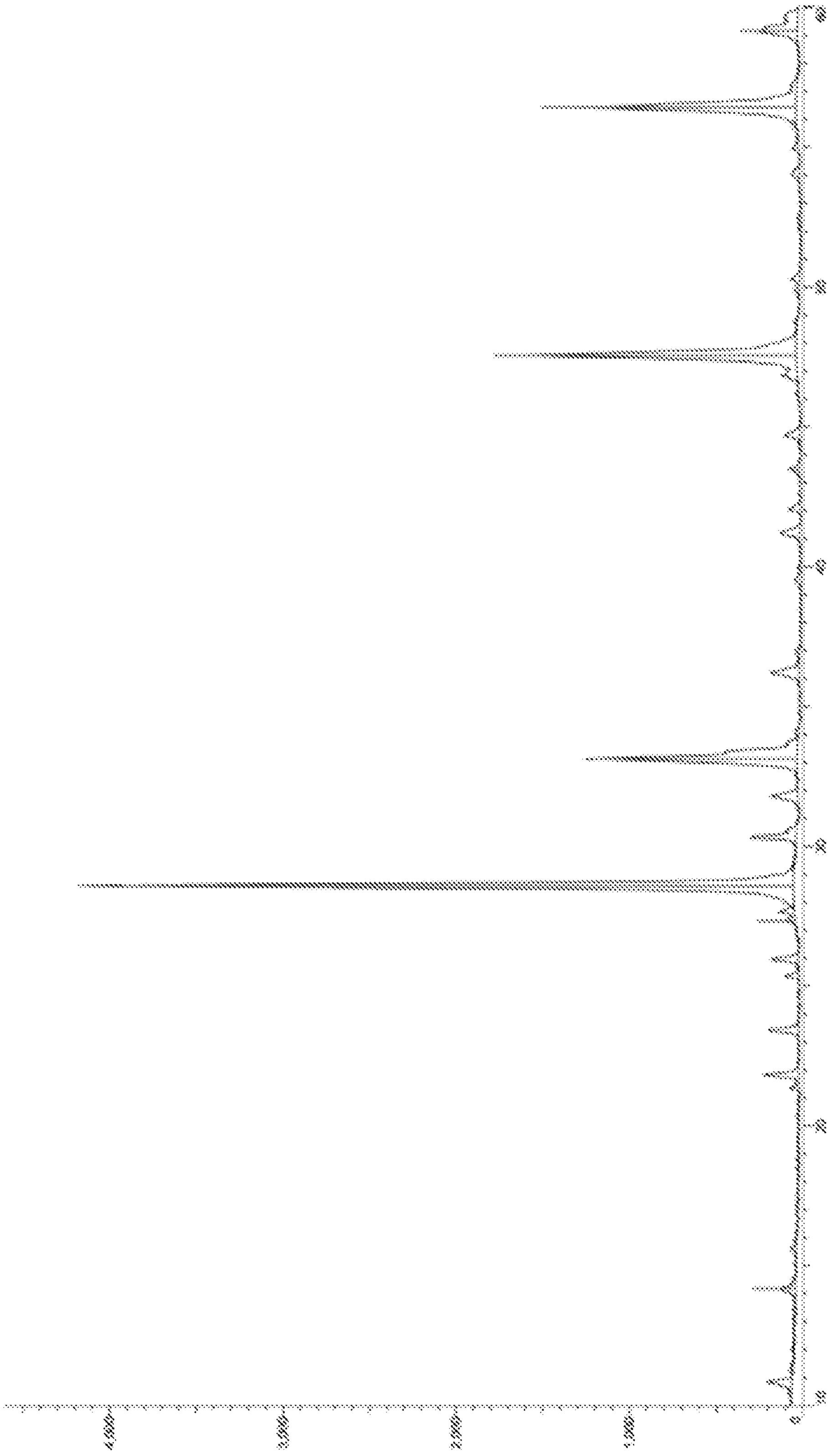
FIGS. 6 and 7 show XRD spectra of the intermediates and the final products produced by the method of preparing the solid-state electrolyte powder according to some embodiments of the present disclosure.
Figure 7:
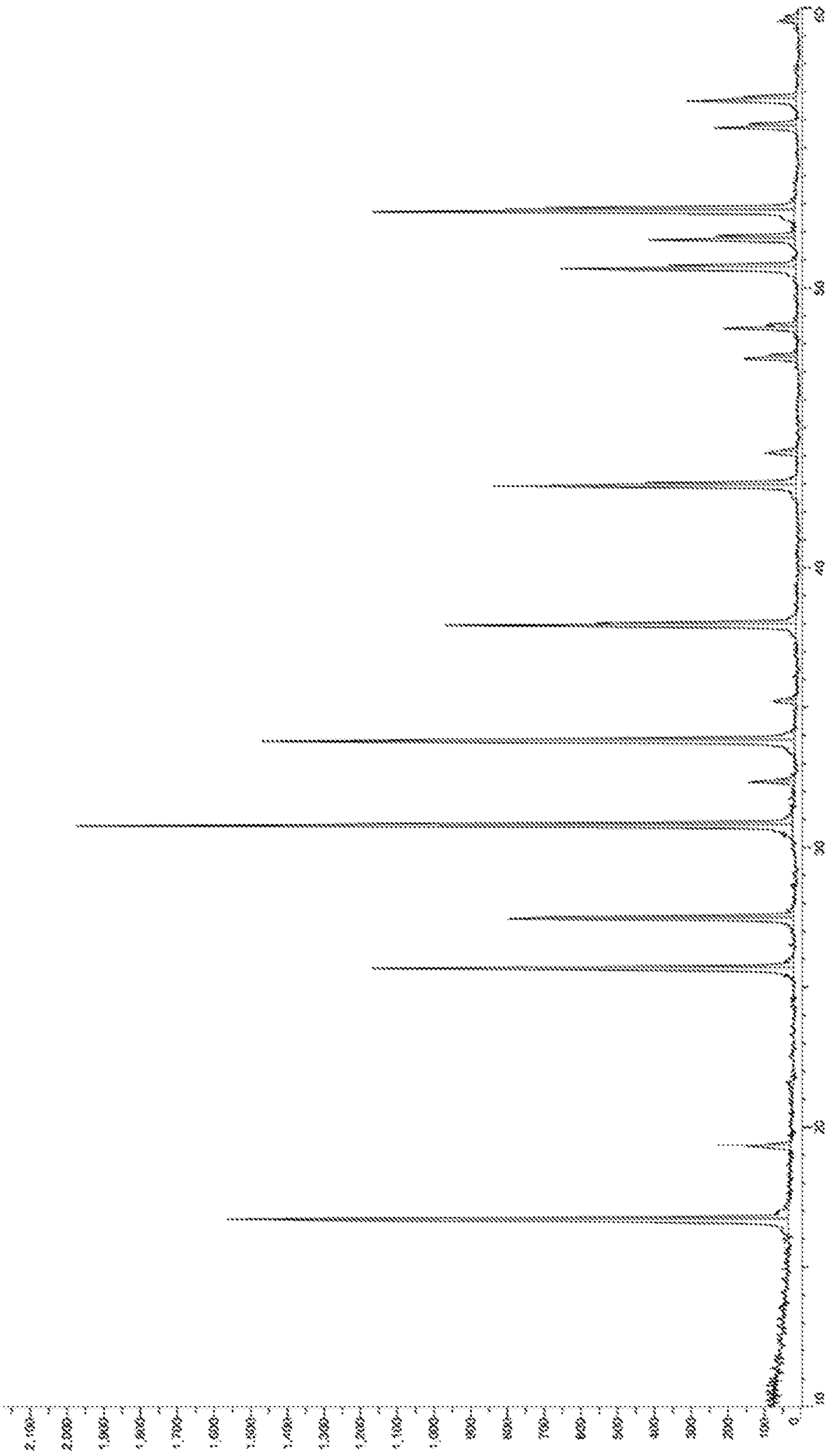

FIGS. 6 and 7 show XRD spectra of the intermediates and the final products produced by the method of preparing the solid-state electrolyte powder according to some embodiments of the present disclosure, in which FIG. 6 shows an XRD spectrum of the solid-state electrolyte powder precursor mixture (i.e., the intermediate) produced after the oxygen-free sintering process, and FIG. 7 shows an XRD spectrum of the solid-state electrolyte powder (i.e., the final product) produced after the oxygen-containing sintering process. The results in FIG. 6 and FIG. 7 show that after the oxygen-free sintering process, the high-purity oxygen-deficient phase LZO can be first obtained (FIG. 6), and then the oxygen-deficient phase LZO can be subjected to the oxygen-containing sintering process, such that a high-purity cubic-type LLZO (FIG. 7) can be obtained. It should be noted that in the method for preparing the solid-state electrolyte powder used in this example, the first salt and the second salt are $La_2O_3$/$ZrO_2$/$Ga_2O_3$ and $Li_2CO_3$, respectively, and the contents are 30-50%/20-40%/1-5% and 20-40%, respectively; in the first grinding process of step S10, the solvent used in the preliminary grinding step is 70 wt % EtOH, the diameter of the grinding beads is 0.3 mm, and the filling ratio is 70%, the grinding speed is 2600-3000 rpm, the grinding time is 4-12 hours, and the grinding temperature is 15-35° C.; in the first grinding process of step S10, the solvent used in the secondary grinding step is 70 wt % EtOH, the diameter of the grinding beads is 0.3 mm, the filling ratio is 80%, the grinding speed is 2400-3000 rpm, the grinding time is 4-12 hours, and the grinding temperature is 15-35° C.; in the oxygen-free sintering process of step S20, the amount of sintering powder is 2.5 kg, the sintering temperature is 800° C., and the sintering time is 6 hours; in the second grinding process of step S30, the grinding temperature is 25-40° C., and the grinding time is 5-15 mins; in the oxygen-containing sintering process of step S40, the amount of sintering powder is 5 kg, the sintering temperature is 970° C., and the sintering time is 12 hours; in the third grinding process of step S50, there are two dry grinding steps and one wet grinding step, where the grinding temperature of the dry grinding step is 25-40° C. and the grinding time is 5-15 mins, while the solvent used in the wet grinding step is dimethylacetamide (DMAC) or methylpyrrolidone (NMP), the diameter of the grinding beads is 0.8 mm, the filling ratio is 80%, the grinding speed is 2400 rpm, the grinding time is 5-8 hours, and the grinding temperature is 25-30° C. In addition, the XRD spectrum shown in FIG. 6 was measured after step S20 and before step S30, while the XRD spectrum shown FIG. 7 was measured after step S40 and before step S50.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for preparing a solid-state electrolyte powder, comprising:

performing an oxygen-free sintering process at a first sintering temperature, such that a salt mixture forms a solid-state electrolyte powder precursor mixture, wherein the salt mixture comprises a first salt and a second salt, the first salt comprises a non-lithium source compound, the second salt comprises a lithium source compound, the content of the first salt is between 70 wt % and 78 wt %, and the content of the second salt is 22 wt % and 30 wt %; and performing an oxygen-containing sintering process at a second sintering temperature, such that the solid-state electrolyte powder precursor mixture forms the solid-state electrolyte powder, wherein the second sintering temperature is higher than the first sintering temperature.

2. The method for preparing the solid-state electrolyte powder of claim 1, wherein the first sintering temperature is between 800° C. and 1100° C., and the second sintering temperature is between 850° C. and 1280° C.

3. The method for preparing the solid-state electrolyte powder of claim 2, further comprising:

performing a grinding process after the oxygen-free sintering process and before the oxygen-containing sintering process, such that the solid-state electrolyte powder precursor mixture forms a refined solid-state electrolyte powder precursor mixture, wherein the oxygen-containing sintering process is performed such that the refined solid-state electrolyte powder precursor mixture forms the solid-state electrolyte powder; and/or performing another grinding process after the oxygen-containing sintering process, such that the solid-state electrolyte powder forms a refined solid-state electrolyte powder.

4. The method for preparing the solid-state electrolyte powder of claim 3, wherein the grinding process performed after the oxygen-containing sintering process comprises at least one wet grinding step and/or at least one dry grinding step.

5. The method for preparing the solid-state electrolyte powder of claim 2, further comprising:

performing a grinding process before the oxygen-free sintering process, such that the salt mixture forms a refined salt mixture, wherein the average particle size (D50) of the first salt before the grinding process is greater than the average particle size (D50) of the second salt before the grinding process, and/or the hardness of the first salt is higher than the hardness of the second salt, and the oxygen-free sintering process is performed such that the refined salt mixture forms the solid-state electrolyte powder precursor mixture.

6. The method for preparing the solid-state electrolyte powder of claim 5, wherein performing the grinding process comprises:

performing a preliminary grinding step, such that the first salt forms a preliminarily refined first salt; and mixing the preliminarily refined first salt and the second salt and performing a secondary grinding step to form the refined salt mixture.

7. The method for preparing the solid-state electrolyte powder of claim 6, wherein a grinding speed of between 2400 rpm and 2800 rpm is used for the preliminary grinding step, and a grinding speed of between 2800 rpm and 3200 rpm is used for the secondary grinding step.

8. The method for preparing the solid-state electrolyte powder of claim 6, wherein the preliminarily refined first salt has an average particle size (D50) of between 5 μm and 20 μm, and the refined salt mixture has an average particle size (D50) between 0.2 μm and 1 μm.

9. The method for preparing the solid-state electrolyte powder of claim 2, wherein the oxygen-containing sintering process is carried out in a sintering equipment comprising at least a first pipeline and a second pipeline, wherein the oxygen required for the oxygen-containing sintering process enters through the first pipeline, and the carbon dioxide generated by the oxygen-containing sintering process exits through the second pipeline.

10. The method for preparing the solid-state electrolyte powder of claim 9, wherein the first pipeline is positioned higher in the sintering equipment than the second pipeline is in the sintering equipment.

11. The method for preparing the solid-state electrolyte powder of claim 1, further comprising:

performing a grinding process after the oxygen-free sintering process and before the oxygen-containing sintering process, such that the solid-state electrolyte powder precursor mixture forms a refined solid-state electrolyte powder precursor mixture, wherein the oxygen-containing sintering process is performed such that the refined solid-state electrolyte powder precursor mixture forms the solid-state electrolyte powder; and/or performing another grinding process after the oxygen-containing sintering process, such that the solid-state electrolyte powder forms a refined solid-state electrolyte powder.

12. The method for preparing the solid-state electrolyte powder of claim 11, wherein the grinding process performed after the oxygen-containing sintering process comprises at least one wet grinding step and/or at least one dry grinding step.

13. The method for preparing the solid-state electrolyte powder of claim 1, wherein the salt mixture comprises a first salt and a second salt, and the method of preparing the solid-state electrolyte powder further comprises:

performing a grinding process before the oxygen-free sintering process, such that the salt mixture forms a refined salt mixture, wherein the average particle size (D50) of the first salt before the grinding process is greater than the average particle size (D50) of the second salt before the grinding process, and/or the hardness of the first salt is higher than the hardness of the second salt, and the oxygen-free sintering process is performed such that the refined salt mixture forms the solid-state electrolyte powder precursor mixture.

14. The method for preparing the solid-state electrolyte powder of claim 13, wherein performing the grinding process comprises:

performing a preliminary grinding step, such that the first salt forms a preliminarily refined first salt; and mixing the preliminarily refined first salt and the second salt and performing a secondary grinding step to form the refined salt mixture.

15. The method for preparing the solid-state electrolyte powder of claim 14, wherein a grinding speed of between 2400 rpm and 2800 rpm is used for the preliminary grinding step, and a grinding speed of between 2800 rpm and 3200 rpm is used for the secondary grinding step.

16. The method for preparing the solid-state electrolyte powder of claim 14, wherein the preliminarily refined first salt has an average particle size (D50) of between 5 μm and 20 μm, and the refined salt mixture has an average particle size (D50) of between 0.2 μm and 1 μm.

17. The method for preparing the solid-state electrolyte powder of claim 1, wherein the oxygen-containing sintering process is carried out in a sintering equipment comprising at least a first pipeline and a second pipeline, wherein the oxygen required for the oxygen-containing sintering process enters through the first pipeline, and the carbon dioxide generated by the oxygen-containing sintering process exits through the second pipeline.

18. The method for preparing the solid-state electrolyte powder of claim 17, wherein the first pipeline is positioned higher in the sintering equipment than the second pipeline is in the sintering equipment.

* * * * *